Feb. 17, 1959  W. MURRAY  2,873,986
COMBINED FLUID AND CONTACT SEAL
Filed Oct. 21, 1955  2 Sheets-Sheet 2
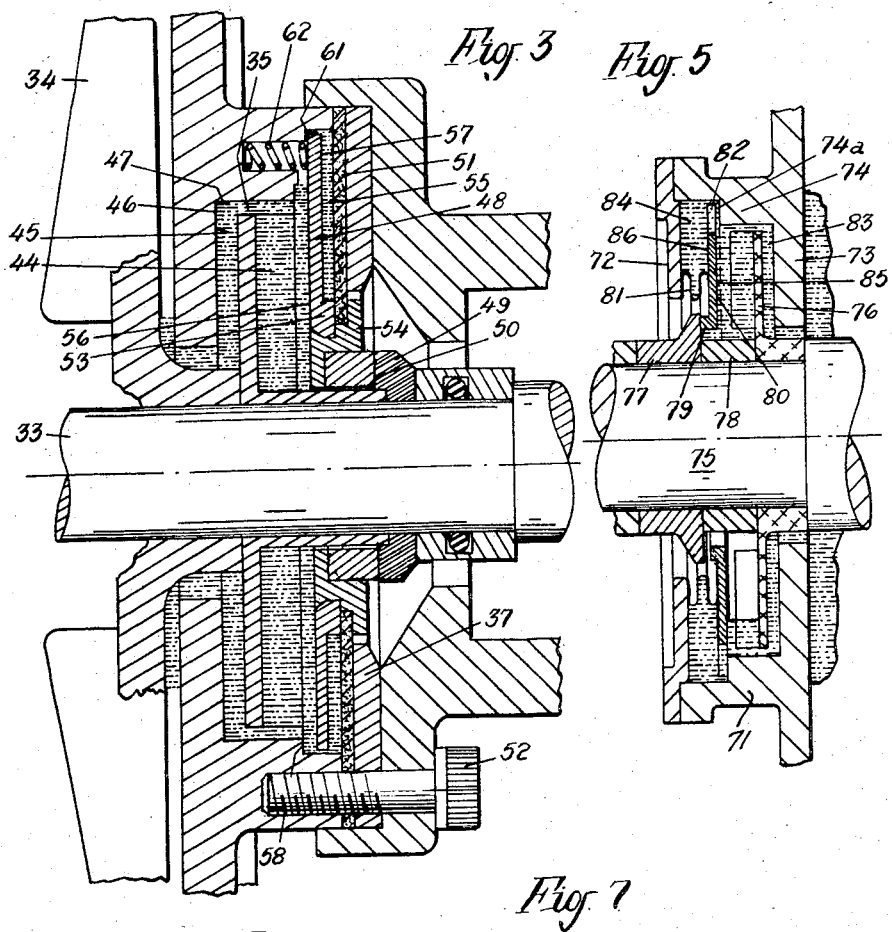
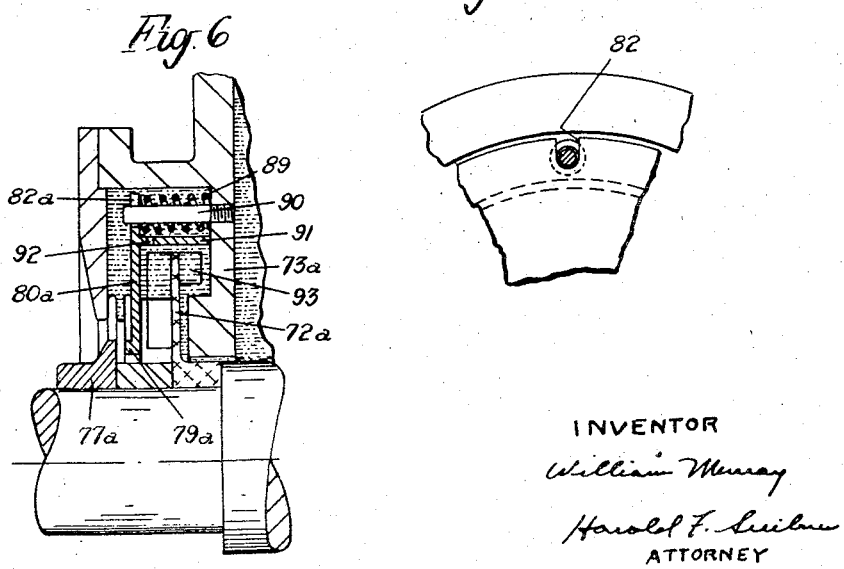
INVENTOR
William Murray
Harold F. Linhan
ATTORNEY

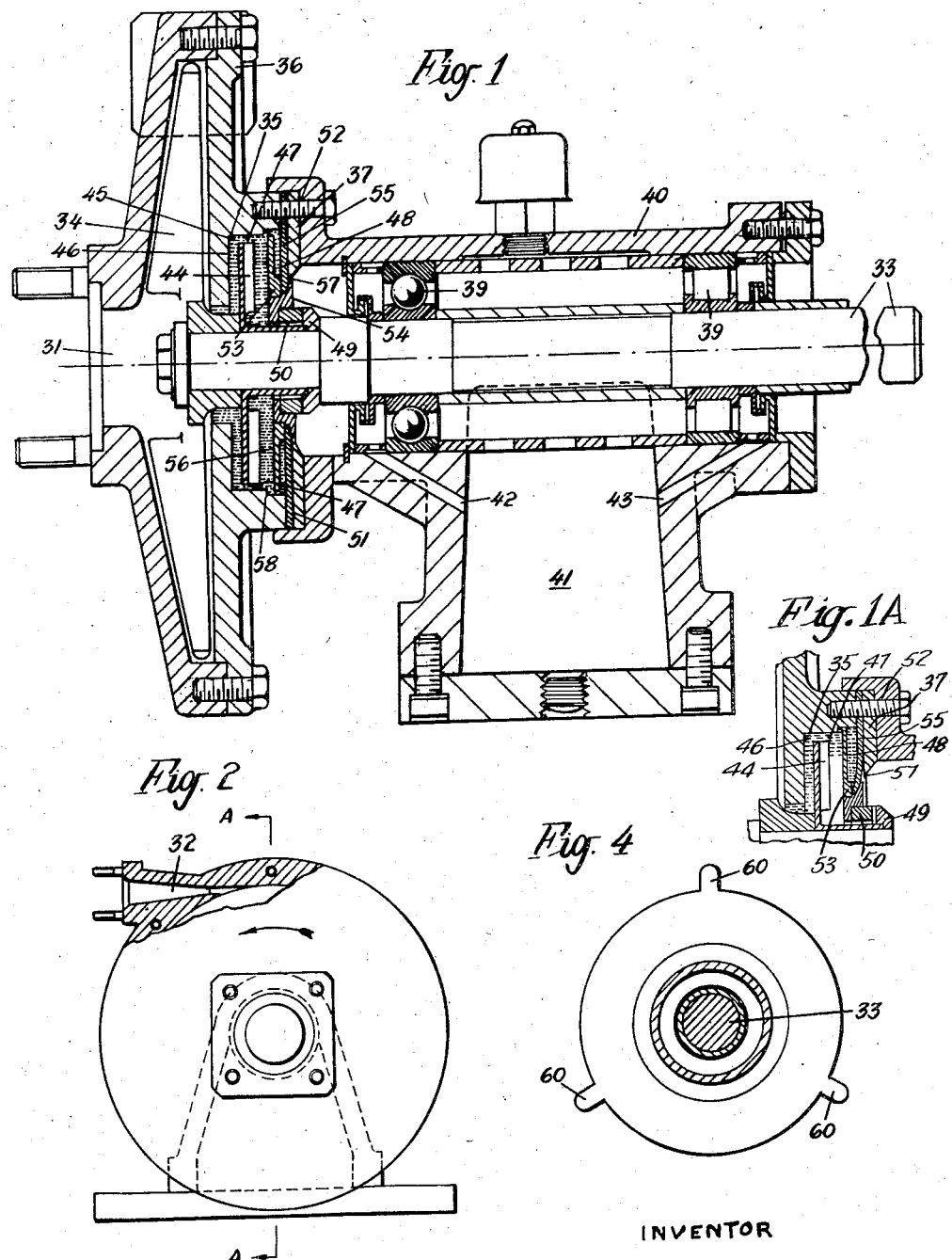

2,873,986

Patented Feb. 17, 1959

---

2,873,986

COMBINED FLUID AND CONTACT SEAL

William Murray, Leamington Spa, England

Application October 21, 1955, Serial No. 542,035

Claims priority, application Great Britain October 21, 1954

3 Claims. (Cl. 286—10)

The present invention relates to seals for preventing leakage of fluids between the relatively rotating parts of machines such as pumps, turbines, electric motors and more particularly to seals which include co-operating members situated on the respective relatively rotatable parts of machines and pressed or adapted to be pressed into contact with each other to form a sliding contact seal (hereinafter called "the contact seal") and which also include further members so constructed that upon rotating a liquid in an annular retaining channel a pressure is centrifugally generated in the said liquid sufficient to prevent leakage of fluid through the said retaining channel (hereinafter called "the liquid seal") the liquid seal coming into operation upon relative rotation of the parts of the machine. Seals so constructed are herein and in the claims hereof called "combined liquid and contact seals of the kind described."

An object of the present invention is to provide such a seal which allows both low and high fluid pressure to be sealed without unduly stressing parts of the seal.

The invention comprises a combined liquid and contact seal of the kind described, one member of the contact seal forming or being adapted to be axially moved by an axially movable annular wall which divides the annular retaining channel of the liquid seal into two communicating parts the one part (hereinafter called "the sealing chamber",) being one in which the sealing liquid can be centrifuged outwards and the other part (hereinafter called "the pressure chamber") being one which communicates with the outer region of the sealing chamber, the sealing chamber and the pressure chamber being so adapted and arranged that (a) under static conditions, they permit sealing liquid to hold the co-operating members of the contact seal in sealing contact and (b) at a predetermined speed of rotation they permit the pressure of the rotating liquid in the sealing chamber acting on the said wall to be so reduced relatively to that of the liquid in the pressure chamber acting on the said wall that there is a resultant pressure whereby the contact pressure between the said members of the contact seal is reduced or eliminated.

The rotation of the liquid to form the liquid seal may be caused by an impeller rotated within the sealing chamber, although in certain forms the wall of the said chamber may rotate or there may be a combination of such means.

Preferably there is a flexible member forming a wall of the pressure chamber, which flexible wall can yield in response to the axial movement of said movable wall and is sealed on the one hand to a housing having the said chambers and on the other hand to the said axially movable wall.

According to one form of seal according to the invention, one side wall of the pressure chamber is formed by an annular diaphragm (forming the said flexible wall) the outer margin of which is clamped to the said housing and the inner margin is sealed to the said axially movable wall.

According to another form of seal according to the invention, an inner peripheral wall (being the said flexible wall) of the pressure chamber is formed by an annular bellows which is sealed to the said housing and to the said axially movable wall.

The flexible wall, e. g., the diaphragm or bellows, may serve to apply resilient pressure to hold the co-operating members of the contact seal in contact, or a light spring or springs may be provided for this purpose, or to assist the flexible wall in that purpose.

The axially movable wall may be a stiff or rigid annular ring or apertured disc and one of the co-operating members of the contact seal may be fixed to the inner periphery of the axially movable wall, in the case of the bellows form preferably inwards of the bellows.

The axially movable wall may be prevented from rotation by the diaphragm or bellows, but means, e. g., one or more pins fixed to one wall of the housing and engaging holes, slots or notches in the movable wall are preferably provided for this purpose so as to relieve the diaphragm or bellows of this duty.

One or more pins may serve as a means to hold helical springs between the said walls whereby the co-operating contact members may be pressed into contact.

The movement of the axially movable wall may be appropriately limited by stop means. For example the said wall may engage a radial stop shoulder formed by the casing. Or the said wall may have an axial sleeve-like projection which engages a side wall of the channel. Such a sleeve-like projection may be used to shroud the impeller and may have one or more openings to allow for passage of the liquid from the sealing chamber to the pressure chamber.

The walls of the channel may be stationary, e. g., may be fixed to or form part of the machine casing.

Forms of seals according to the invention are illustrated by way of example in the accompanying drawings as applied to a centrifugal pump and in which Fig. 1 is a sectional elevation through the pump and seal and Fig. 1a shows the contact seal released and the liquid seal produced.

Fig. 2 is an end view partly in section of the pump.

Fig. 3 is a sectional elevation of a modified from and Fig. 4 is a partial end view thereof. Fig. 5 is a section of another form, Fig. 6 is a section of yet another form and Fig. 7 a fragmentary detail thereof.

With reference to Figs. 1, 1a and 2 of the drawings, in the pump illustrated the liquid enters axially through inlet 31 and is discharged tangentially through one or more outlets 32 (Fig. 2). The shaft 33 carrying the pump impeller 34 is sealed by the seal according to the invention.

The seal comprises a fixed annular liquid-retaining channel 35 formed by the body 36 of the pump casing and the end plate 37.

The rotary shaft 33 of the pump is supported by ball and/or roller bearings 39 arranged in an extension 40 of the pump casing and to which lubricant can be circulated by way of chamber 41 and the ducts 42, 43.

To the rotary shaft 33 is fixed an impeller 44 rotating in the sealing chamber 45 which is formed between the radial wall 46 and the peripheral wall 47 provided by the pump casing and a wall 48 which is a stiff or rigid apertured disc and is free for axial movement.

The shaft 33 carries a ring or collar 49 which forms one member of the contact seal, the co-operating member of the contact seal being a ring or collar 50 secured to the inner periphery of the movable wall 48.

A centrally apertured diaphragm 51 is marginally clamped by the bolts 52 between the pump casing and the aforesaid end plate 37, the inner periphery of the diaphragm being sealed in an annular recess formed by the movable wall, i. e., between an inner ring-like enlargement 53 of the wall and a ring 54 secured thereto and carrying the member 50 of the contact seal.

The diaphragm may normally resiliently press the member 50 into sealing engagement with the member 49 or assist the liquid under static pressure in doing so (Fig. 1). Between the diaphragm and the movable wall 48 a pressure chamber 55 is formed to which liquid being conveyed by the pump can have access by way of the aforesaid sealing chamber 45 around the periphery of the movable wall.

Fig. 1 shows the liquid in the sealing and pressure chambers when the pump is static.

When the pump is running the liquid is centrifuged outwards in the sealing chamber with the aid of the impeller 44 to produce the liquid seal in the said chamber as indicated in Fig. 1a.

During static conditions, full liquid pressure acts upon the whole of the surface 56 of the movable wall exposed to the sealing chamber and upon the major portion of the opposite face 57 of the said wall. The liquid pressure then causes or assists in causing the member 50 of the contact seal to be pressed against the member 49 of such seal. This occurs whether the positive pressure of the liquid be low or high. For high pressures the area of the face 57 of the movable wall against which the liquid can apply pressure can be made suitably large to prevent excessive contact between the co-operating members of the contact seal and friction and wear of the sealing faces can be limited.

During operating conditions, i. e., when the shaft is rotating, full liquid pressure is maintained in the pressure chamber 55 but the area of pressure acting upon the surface 56 of the movable wall is reduced by the action of the sealing impeller on the liquid. Therefore (see Fig. 1a) the unbalanced liquid pressure forces the wall 48 to move towards the impeller and the diaphragm to flex until the wall 48 comes to rest at the stop face 58 and is held in this position, the pressure between the co-operating members of the contact seal being reduced or eliminated. The communication between the sealing chamber 45 and the pressure chamber 55 is maintained by the space around the movable wall.

In Figs. 3 and 4, showing a modified construction, the corresponding parts to those shown in Figs. 1 and 2 are indicated by the same reference numerals. In this form the movable wall 48 is provided with a number of radial peripheral tongues 60 which engage recesses 61 in the pump casing to locate the said wall against rotation whilst permitting axial movement, a corresponding number of light helical springs 62 co-operating with the tongues to assist in making the contact seal, the resistance of these springs being overcome when the wall 48 is to move axially to break or lessen the contact between the rings 49 and 50.

Referring to Fig. 5 of the drawings, 71 indicates a part of or a part fixed to the machine casing. A fixed liquid-retaining channel is formed by the side walls 72, 73 and the peripheral wall 74 (the side wall 72 serving also as a cover). 75 is a rotary shaft to which is fixed an impeller 76 and a ring 77 which forms one of the co-operating members of the contact seal, 78 being a spacing sleeve between the ring 77 and the impeller boss. The other co-operating member 79 of the contact seal is disposed at the inner periphery of the annular ring member 80 which forms the movable wall hereinbefore referred to. Between the outer face of this wall (i. e., the face remote from the impeller), and the side wall 72 of the channel is arranged a flexible bellows 81 which is fluid tightly connected to both said walls. This side wall 72 is a separate member appropriately fixed to the peripheral wall 74.

In the outer periphery of the movable wall 80 a number of radial notches 82 are provided. Some radial clearance is left between the periphery of the movable wall and the internal cylindrical face of the peripheral wall 74 and this face and/or other suitable guide means may serve to locate the wall in its central position.

The movable wall divides the annular channel into a sealing chamber 83 and a pressure chamber 84, both chambers, in the static condition, being filled with liquid and the chambers communicating by way of the aforesaid slots and the said clearance.

It is desirable to have a pressure contact between the co-operating members 77 and 79 of the contact seal when the machine casing and the seal are empty, and this contact can be obtained by the resilience of the bellows and/or by a spring or springs.

The inner cylindrical face of the peripheral wall 74 is shouldered, the radial face 74a of the shoulder forming a stop for the movable wall is hereinafter described.

During static conditions, full liquid pressure acts upon the whole inner surface 85 of the movable wall 80 but only upon the outer margin of the outer surface 86, i. e., the surface which forms part of the inner surface of the pressure chamber 84. There is therefore a pressure differential between opposite sides of the movable wall so that the liquid pressure presses the member 79 of the contact seal against the co-operating member 77. This occurs whether the pressure of the liquid be low or high. For high liquid pressures the marginal area of the surface 86 of the movable wall against which the liquid can apply pressure can be made suitably large to prevent excessive contact pressure between the co-operating members of the contact seal and friction and wear of the sealing faces (if any) can be limited.

During operating conditions, i. e., when the shaft is rotating, full liquid pressure is maintained in the pressure chamber 84 but the area of pressure acting upon the inner surface 85 of the movable wall 80 is greatly reduced by the action of the sealing impeller on the liquid. Therefore, the unbalanced liquid pressure in chamber 84 forces the wall 80 to move towards the impeller until it comes to rest at the face 74a and is held in this position. The communication between the sealing chamber 83 and the pressure chamber 84 is maintained by the radial notches 82 and the aforesaid clearance.

In the form shown in Figs. 6 and 7 the movable wall 80a extends radially still further beyond the periphery of the impeller 72a so that springs 89 (three or more, as required) can be accommodated outside the impeller periphery. Pins 90 fixed to the wall 73a of the channel extend through radial slots 82a of the wall 80a and serve as guiding members for the said wall and for the springs. The pins 90 also prevent the wall 80a from rotating under low speed conditions when the co-operating members 77a, 79a of the contact seal are still in contact. In the form according to Fig. 5 this function is left to the bellows 81. A cylindrical shroud 91 surrounds the impeller 72a and is part of the wall 80a. This prevents turbulence of the liquid around the impeller 72a. Its axial length is such that it limits the movement of the wall 80a towards the impeller. During running conditions, as shown in Figs. 6 and 7, the free end of the shroud 91 therefore is in contact and provides a limiting stop with the wall 73a of the channel.

If desired the shroud may be fixed to or made integral with the channel instead of the wall 80a.

Communicating holes 92 between the sealing and pressure chambers are provided in the shroud 91.

The impeller as shown in Fig. 6 is provided on its side remote from the movable wall with short blades 93 which come into operation if negative differential pressure occurs during operating conditions, but the provision of such blades is optional.

The movement of the movable wall which is permitted may be made very small by appropriate disposition of the stop and the axial clearance between the wall and the impeller may be appropriately selected.

What I claim is:

1. A seal for preventing leakage of fluids between relatively rotating seal housing and shaft elements of machines and comprising sliding pressure contact seal means formed by co-operating members situated on the said elements, said housing element including an annular liquid-retaining sealing channel and said shaft element carrying an impeller rotatable in said channel to cause a pressure to be centrifugally generated in liquid therein, an axially movable annular wall which forms one side wall of the said sealing channel and a flexible wall fixedly sealed on the one hand to the said housing element and on the other hand to an inward region of the said axially movable wall and forming with the said latter wall and said housing element an inwardly closed pressure channel on the side of the said axially movable wall opposite to the sealing channel, the said sealing and pressure channels having communication at their outer region, one of said co-operating members of the said contact seal means being carried by the said axially movable wall inwards of said pressure channel and the other of said co-operating members being carried by the shaft element, said sealing and pressure channels at a predetermined speed of rotation of the shaft element and impeller permitting liquid in the sealing channel to centrifuge outwards therein and form the liquid seal and trap liquid in the pressure channel so that it displaces said axially movable wall towards the impeller and reduces or eliminates the pressure between the said members of the contact seal.

2. A seal according to claim 1, in which said axially movable wall is a rigid annular ring and said flexible wall is a centrally apertured disc-like diaphragm, said housing comprising components marginally clamping the said diaphragm, means at the inner margin of the said rigid ring sealing the inner margin of said diaphragm to said ring, said latter means carrying the corresponding member of the contact seal inwardly of the region where the inner margin of the diaphragm is sealed to the inner margin of said rigid ring.

3. A seal according to claim 1 in which said axially movable wall is a rigid annular ring and said flexible wall is an axially extendable bellows, one end of said bellows being fixedly sealed to the said ring and the other end of the said bellows being fixedly sealed to a diametral wall of the housing said bellows co-operating with the said ring and the housing to form the said pressure channel on the side of the said ring opposite to the sealing channel, said bellows forming a sealed inner wall of the said pressure chamber located nearer the axis of the shaft element than the outer peripheral wall of the said sealing channel.

References Cited in the file of this patent

UNITED STATES PATENTS

| | | |
|---|---|---|
| 1,932,214 | Hornschuch | Oct. 24, 1933 |
| 1,964,063 | Kägi | June 26, 1934 |
| 2,370,964 | Janette | Mar. 6, 1945 |
| 2,622,902 | Malmvik | Dec. 23, 1952 |
| 2,646,999 | Barske | July 28, 1953 |
| 2,738,208 | Mylander | Mar. 13, 1956 |